United States Patent
Kummli et al.

(10) Patent No.: US 7,203,018 B1
(45) Date of Patent: Apr. 10, 2007

(54) SERVO WRITER WITH CLAMPING PUSH PIN

(75) Inventors: Konrad Kummli, Berthoud, CO (US); Paul R. King, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 10 days.

(21) Appl. No.: 11/082,985

(22) Filed: Mar. 17, 2005

Related U.S. Application Data

(63) Continuation-in-part of application No. 10/955,921, filed on Sep. 30, 2004, now abandoned.

(60) Provisional application No. 60/509,350, filed on Oct. 7, 2003.

(51) Int. Cl.
*G11B 21/02* (2006.01)
*G11B 5/596* (2006.01)
*G11B 5/55* (2006.01)

(52) U.S. Cl. .................. 360/75; 360/77.02; 360/78.04

(58) Field of Classification Search ............ None
See application file for complete search history.

(56) References Cited

U.S. PATENT DOCUMENTS 6,760,180 B2 *  7/2004  Kino et al. ................. 360/75

* cited by examiner

*Primary Examiner*—Andrea Wellington
*Assistant Examiner*—Jason Olson
(74) *Attorney, Agent, or Firm*—James L. Johnson

(57) ABSTRACT

A servo writer that uses a clamping push pin is disclosed. The clamping push pin includes a first clamping member that is movable relative to a second clamping member. The first clamping member is spaced from the second clamping member such that a disk drive head positioner assembly may be positioned therebetween. The spacing between the first clamping member and second clamping member is then reduced such that the push pin clamps onto the head positioner assembly. The push pin may then be moved to change the position of the head positioner assembly as required for servo writing operations.

46 Claims, 8 Drawing Sheets

SERVO WRITER WITH CLAMPING PUSH PIN

CROSS-REFERENCE TO RELATED APPLICATIONS

This patent application is a continuation-in-part of, and claims priority under 35 U.S.C. §120 to U.S. patent application Ser. No. 10/955,921, that was filed on Sep. 30, 2004, now abandoned and that is entitled "SERVO WRITER WITH CLAMPING PUSH PIN," and further claims priority under 35 U.S.C. §119(e) to pending U.S. Provisional Patent Application Ser. No. 60/509,350, that was filed on Oct. 7, 2003, and that is entitled "Clamping Push Pin for Servo Track Writer." The entire disclosure of both of these patent applications is hereby incorporated by reference in their entirety herein.

FIELD OF THE INVENTION

The present invention generally relates to the field of servo writing operations for disk drives and, more particularly, to a servo writer having a push pin that clamps onto a head positioner assembly of a disk drive for position control during servo writing operations.

BACKGROUND OF THE INVENTION

Servo writing operations in the disk drive art generally entail writing servo information at various locations on a data storage disk(s) of a disk drive utilizing the head(s) of the disk drive. This servo information is used during normal disk drive operations to accurately position the head(s) of the disk drive relative to the desired data storage track of its corresponding data storage disk. Conventional servo writing operations generally entails directing a push pin through a push pin hole in the base plate of the disk drive to engage a single side of an actuator arm of a head positioner assembly of the disk drive. This push pin is mounted on a positioning arm of the servo writer. Movement of the disk drive head positioner assembly is accomplished by pivoting the servo writer positioning arm in a controlled manner. Since the push pin of the servo writer is engaged with one side of an actuator arm of the head positioner assembly at this time, the head positioner assembly is also pivoted to a different position relative to the data storage disk(s) of the disk drive by the push pin "pushing" on the head positioner assembly. A back-bias is commonly used to better control this movement of the head positioner assembly. Specifically, the voice coil motor of the disk drive is operated during servo writing operations in a manner so as to exert a force on the head positioner assembly that opposes the force being exerted on the head positioner assembly by the servo writer through its push pin to maintain contact between the push pin and head positioner assembly.

What is referred to as a "cube clamp" has been used for servo writing operations generally of the above-noted type. A cube clamp may be part of the optical system used by the servo writer to accurately control the position of its positioning arm, and thereby the head positioner assembly of the disk drive. Reflectors are mounted on the cube clamp to reflect laser beams that are used for position control purposes. That is, the cube clamp is a sensor of sorts. It is known to mount the cube clamp on the head positioner assembly of the disk drive using a clamping-type force. It is also known to mount the cube clamp on the servo writer itself. In the first instance, the voice coil motor is used to control the position of the head positioner assembly—the servo writer need not use a push pin in this case. In the second instance, a conventional push pin is still used to engage the head positioner assembly of the disk drive to transmit the force to the head positioner assembly that moves it to a new position relative to the data storage disk(s) of the disk drive. That is, the servo writer push pin engages the head positioner assembly at a single location and is moved in the direction of the head positioner assembly so as to remain in contact with the head positioner assembly and thereby change the position of head positioner assembly by "pushing" on the head positioner assembly.

BRIEF SUMMARY OF THE INVENTION

The present invention is embodied by a servo writer that has a push pin that clamps onto a relevant portion of a disk drive head positioner assembly. Movement of the servo writer push pin is used to change the position of the disk drive head positioner assembly for servo writing operations. Both the configuration of the servo writer push pin and the use of the same in servo writing operations are within the scope of the present invention.

A first aspect of the present invention is embodied by a method for making a disk drive. The disk drive includes a first data storage medium (e.g., a disk) and a head positioner assembly that is movable relative to the first data storage medium. A servo writer that is used in the making of the disk drive includes a push pin that interfaces with the head positioner assembly to control the position thereof relative to the first data storage medium for servo writing operations. The method includes clamping the push pin onto a first portion of the head positioner assembly. A first force is transmitted to the disk drive head positioner assembly through the servo writer push pin to move the head positioner assembly from a first position to a second position relative to the first data storage medium of the disk drive. Servo information is written on the first data storage medium.

Various refinements exist of the features noted in relation to the first aspect of the present invention. Further features may also be incorporated in the first aspect of the present invention as well. These refinements and additional features may exist individually or in any combination. Any configuration may be used by the disk drive head positioner assembly, which includes that structure of the disk drive having one or more transducers (e.g., heads) for exchanging information with the drive's data storage medium (e.g., one or more data storage disks). The disk drive head positioner assembly also may move in any appropriate manner during normal disk drive operations and during servo writing operations (although the head positioner assembly will typically move the same way during both normal disk drive operations and during servo writing operations). In one embodiment, the head positioner assembly is a rotary or pivoting type that moves about an axis (e.g., by a pivot bearing that movably interconnects the head positioner assembly with the base plate and/or cover of the disk drive). In this case, typically the servo writer push pin will engage the disk drive head positioner assembly at a location that is spaced from the axis about which the head positioner assembly moves. However, the first aspect is not limited to the servo writer push pin engaging the head positioner assembly in this manner. Instead, the servo writer push pin may engage the head positioner assembly in any manner so long as the servo writer push pin clamps onto the first portion of the head positioner assembly at a location that allows the servo writer to control the position of the head positioner assembly.

Servo writing operations in the case of the first aspect may be undertaken with the various components of the disk drive being within an at least substantially enclosed space. In this case, the servo writer push pin may be directed through a push pin hole in the disk drive base plate for engagement with the first portion of the head positioner assembly. Once the servo writer push pin has been clamped onto the first portion of the head positioner assembly, the servo writer push pin may be moved one or more times relative to the data storage medium to position the disk drive head(s) at a desired location (e.g., a certain distance from a rotational axis of the data storage medium) for writing servo information on the data storage medium. The servo writer push pin maintains the head positioner assembly in a fixed position at each such location as servo information is written onto the data storage medium. Upon completion of servo writing operations, the push pin may be released from the first portion of the head positioner assembly, and thereafter the servo writer push pin may be withdrawn back through the push pin hole. That is, the servo writer push pin may appropriately disengage the first portion of the head positioner assembly upon completion of servo writing operations (and prior to the servo writer push pin being withdrawn back through the push pin hole).

The clamping of the push pin onto the first portion of the head positioner assembly is subject to a number of characterizations in the case of the first aspect. Opposing forces may be exerted on the first portion of the head positioner assembly by the servo writer push pin. These opposing forces may be coplanar with or parallel to the plane in which the head positioner assembly moves, may be orthogonal to the plane in which the head positioner assembly moves, or in any other appropriate orientation. Any appropriate portion of the head positioner assembly may be engaged by the servo writer push pin, so long as the engaged portion moves along with the head positioner assembly. Therefore, any attachment to the head positioner assembly that is mounted on the head positioner assembly in a fixed position could be engaged by the push pin. This attachment would then be considered as being part of the head positioner assembly. In one embodiment, the servo writer push pin engages a first actuator arm of the head positioner assembly. Another embodiment has the servo writer push pin engaging opposite sides of such a first actuator arm. "Sides" means the structural boundaries of the first actuator arm that are spaced in the dimension in which the head positioner assembly at least generally moves. The servo writer push pin may clamp onto the first actuator arm, or any other portion of the head positioner assembly, in any appropriate manner (e.g., the push pin could engage upper and lower surfaces of the first actuator arm).

The push pin in the case of the first aspect may include first and second clamping members. In one embodiment, the first and second clamping members are separated by a first space, the first portion of the head positioner assembly is located between the first and second clamping members in this first space (e.g., by moving the servo writer push pin relative to the head positioner assembly, for instance along an axis that is collinear or parallel with an axis about which the head positioner assembly moves), and the width of this first space is reduced to clamp the push pin onto the first portion of the head positioner assembly. The push pin may be released from the head positioner assembly upon termination of the writing operation by increasing the width of the first space such that at least one of the first and second clamping members becomes disengaged from the first portion of the head positioner assembly.

Only a relative movement between the above-noted first and second clamping members is required to clamp the servo writer push pin onto the first portion of the head positioner assembly in the case of the first aspect. One embodiment has the second clamping member being maintained in a stationary position while the first clamping member is moved to clamp the push pin onto the first portion of the head positioner assembly. Another embodiment has at least one of the first and second clamping members being movable relative to the other of the first and second clamping members for clamping the push pin onto the first portion of the head positioner assembly. As such, one or both of the first and second clamping members may be moved relative to the other of the first and second clamping members to clamp the push pin onto the first portion of the head positioner assembly.

The transmission of the first force to the head positioner assembly through the servo writer push pin, that changes the position of the head positioner assembly relative to the first data storage medium, is also subject to a number of characterizations in the case of the first aspect. This first force may be characterized as being different from the force that is used to clamp the push pin onto the first portion of the head positioner assembly. This first force also may be characterized as being transmitted after the push pin has been clamped to, and while it remains clamped on, the first portion of the head positioner assembly. The servo writer push pin may be moved in any appropriate manner to transmit the first force to the disk drive head positioner assembly to control its position. One embodiment has the push pin moving at least generally about a first axis. Another embodiment has the push pin being mounted on a servo writer positioning arm, such that this servo writer positioning arm may then be pivoted to in turn move the head positioner assembly (as the servo writer push pin is clamped onto the first portion of the head positioner assembly at this time). Yet another embodiment has the servo writer push pin engaging the head positioner assembly at a location that is spaced from an axis about which the head positioner assembly moves.

One advantage of the first aspect is that the clamping of the servo writer push pin onto the first portion of the head positioner assembly alleviates the need for exerting a back-bias on the head positioner assembly during servo writing operations. For instance, a disk drive voice coil motor associated with the head positioner assembly need not be operated in a manner so as to exert a force on the head positioner assembly that opposes the first force being transmitted to the head positioner assembly through the servo writer push pin. This may be beneficial in a number of respects.

A second aspect of the present invention is embodied by a method for making a disk drive. The disk drive includes a first data storage medium (e.g., a disk) and a head positioner assembly that is movable relative to the first data storage medium. A servo writer that is used in the making of the disk drive includes a push pin that interfaces with the head positioner assembly to control the position thereof relative to the first data storage medium during servo writing operations. The method includes clamping the push pin onto a first portion of the head positioner assembly. The servo writer push pin is then moved relative to the first data storage medium, to in turn move the head positioner assembly from a first position to a second position relative to the first data storage medium of the disk drive. That is, since the servo writer push pin is clamped onto the head positioner assembly, movement of the servo writer push pin is translated to the servo writer head positioner assembly. Servo information is written on the first data storage medium.

Various refinements exist of the features noted in relation to the second aspect of the present invention. Further features may also be incorporated in the second aspect of the present invention as well. These refinements and additional features may exist individually or in any combination. Any configuration may be used by the disk drive head positioner assembly, which includes that structure of the disk drive having one or more transducers (e.g., heads) for exchanging information with the drive's data storage medium (e.g., one or more data storage disks). The disk drive head positioner assembly also may move in any appropriate manner during normal disk drive operations and during servo writing operations (although the head positioner assembly will typically move the same way during both normal disk drive operations and during servo writing operations). In one embodiment, the head positioner assembly is a rotary or pivoting type that moves about an axis (e.g., by a pivot bearing that movably interconnects the head positioner assembly with the base plate and/or cover of the disk drive). In this case, typically the servo writer push pin will engage the disk drive head positioner assembly at a location that is spaced from the axis about which the head positioner assembly moves. However, the second aspect is not limited to the servo writer push pin engaging the head positioner assembly in this manner. Instead, the servo writer push pin may engage the head positioner assembly in any manner so long as the servo writer push pin clamps onto the first portion of the head positioner assembly at a location that allows the servo writer to control the position of the head positioner assembly.

Servo writing operations in the case of the second aspect may be undertaken with the various components of the disk drive being within an at least substantially enclosed space. In this case, the servo writer push pin may be directed through a push pin hole in the disk drive base plate for engagement with the first portion of the head positioner assembly. Once the servo writer push pin has been clamped onto the first portion of the head positioner assembly, the servo writer push pin may be moved one or more times relative to the data storage medium to position the disk drive head(s) at a desired location (e.g., a certain distance from a rotational axis of the data storage medium) for writing servo information on the data storage medium. The servo writer push pin maintains the head positioner assembly in a fixed position at each such location as servo information is written onto the data storage medium. Upon completion of servo writing operations, the push pin may be released from the first portion of the head positioner assembly, and thereafter the servo writer push pin may be withdrawn back through the push pin hole. That is, the servo writer push pin may appropriately disengage the first portion of the head positioner assembly upon completion of servo writing operations (and prior to the servo writer push pin being withdrawn back through the push pin hole).

The clamping of the push pin onto the first portion of the head positioner assembly is subject to a number of characterizations in the case of the second aspect. Opposing forces may be exerted on the first portion of the head positioner assembly by the servo writer push pin. These opposing forces may be coplanar with or parallel to the plane in which the head positioner assembly moves, may be orthogonal to the plane in which the head positioner assembly moves, or in any other appropriate orientation. Any appropriate portion of the head positioner assembly may be engaged by the servo writer push pin, so long as the engaged portion moves along with the head positioner assembly. Therefore, any attachment to the head positioner assembly that is mounted on the head positioner assembly in a fixed position could be engaged by the push pin. This attachment would then be considered as being part of the head positioner assembly. In one embodiment, the servo writer push pin engages a first actuator arm of the head positioner assembly. Another embodiment has the servo writer push pin engaging opposite sides of such a first actuator arm. "Sides" again means the structural boundaries of the first actuator arm that are spaced in the dimension in which the head positioner assembly at least generally moves. The servo writer push pin may clamp onto the first actuator arm, or any other portion of the head positioner assembly, in any appropriate manner (e.g., the push pin could engage upper and lower surfaces of the first actuator arm).

The push pin in the case of the second aspect may include first and second clamping members. In one embodiment, the first and second clamping members are separated by a first space, the first portion of the head positioner assembly is located between the first and second clamping members in this first space (e.g., by moving the servo writer push pin relative to the head positioner assembly, for instance along an axis that is collinear or parallel with an axis about which the head positioner assembly moves), and the width of this first space is reduced to clamp the push pin onto the first portion of the head positioner assembly. The push pin may be released from the head positioner assembly upon termination of the writing operation by increasing the width of the first space such that at least one of the first and second clamping members becomes disengaged from the first portion of the head positioner assembly.

Only a relative movement between the above-noted first and second clamping members is required to clamp the servo writer push pin onto the first portion of the head positioner assembly in the case of the second aspect. One embodiment has the second clamping member being maintained in a stationary position while the first clamping member is moved to clamp the push pin onto the first portion of the head positioner assembly. Another embodiment has at least one of the first and second clamping members being movable relative to the other of the first and second clamping members for clamping the push pin onto the first portion of the head positioner assembly. As such, one or both of the first and second clamping members may be moved relative to the other of the first and second clamping members to clamp the push pin onto the first portion of the head positioner assembly.

The movement of the servo writer push pin is also subject to a number of characterizations in the case of the second aspect. One characterization is that the servo writer push pin moves at least generally along an arcuate path. Another characterization is that the servo writer push pin moves at least generally about a first axis. In one embodiment, the push pin is mounted on a servo writer positioning arm, such that this servo writer positioning arm may then be pivoted to in turn move the head positioner assembly (as the servo writer push pin is clamped onto the first portion of the head positioner assembly at this time). Although the servo writer push pin may clamp onto the head positioner assembly at any appropriate location for controlling its position during servo writer operations, in one embodiment the servo writer push pin clamps onto the head positioner assembly at a location that is spaced from an axis about which the head positioner assembly moves.

Multiple forces may be exerted on the head positioner assembly by the servo writer push pin in the case of the second aspect. One such force is the force by which the servo writer push pin clamps onto the head positioner assembly. Another force is the force that is exerted on the head positioner assembly by a movement of the servo writer push pin and while the servo writer push pin remains clamped onto the head positioner assembly.

One advantage of the second aspect is that the clamping of the servo writer push pin onto the first portion of the head positioner assembly alleviates the need for exerting a back-bias on the head positioner assembly during servo writing operations. For instance, a disk drive voice coil motor associated with the head positioner assembly need not be operated in a manner so as to exert a force on the head positioner assembly that opposes the force being exerted on the head positioner assembly by a movement of the servo writer push pin that changes the position of the head positioner assembly. This may be beneficial in a number of respects.

A third aspect of the present invention is embodied by a method for making a disk drive. The disk drive includes a first data storage medium (e.g., a disk) and a head positioner assembly that is movable relative to the first data storage medium. A servo writer that is used in the making of the disk drive includes first and second clamping members for interfacing with the head positioner assembly to control the position thereof relative to the first data storage medium for servo writing operations. An appropriate portion of the head positioner assembly is directed into a space between the first and second clamping members (e.g., by collectively moving the first and second clamping members of the servo writer as a single unit relative to the head positioner assembly, for instance along an axis that is collinear or parallel with an axis about which the head positioner assembly moves), and the width of this space is reduced such that opposing portions of the head positioner assembly are engaged by the first and second clamping members. The first and second clamping members are then collectively moved as a single unit (moved together) relative to the first data storage medium, to in turn move the head positioner assembly from a first position to a second position relative to the first data storage medium. That is, since the first and second clamping members of the servo writer are engaging opposing portions of the head positioner assembly, a subsequent movement of the first and second clamping members as a single unit is translated to the head positioner assembly. Servo information is written on the first data storage medium.

Various refinements exist of the features noted in relation to a third aspect of the present invention. Further features may also be incorporated in the third aspect of the present invention as well. These refinements and additional features may exist individually or in any combination. Any configuration may be used by the disk drive head positioner assembly, which includes that structure of the disk drive having one or more transducers (e.g., heads) for exchanging information with the drive's data storage medium (e.g., one or more data storage disks). The disk drive head positioner assembly also may move in any appropriate manner during normal disk drive operations and during servo writing operations (although the head positioner assembly will typically move the same way during both normal disk drive operations and during servo writing operations). In one embodiment, the head positioner assembly is a rotary or pivoting type that moves about an axis (e.g., by a pivot bearing that movably interconnects the head positioner assembly with the base plate and/or cover of the disk drive). In this case, typically the first and second clamping members of the servo writer will engage the disk drive head positioner assembly at a location that is spaced from the axis about which the head positioner assembly moves. However, the third aspect is not limited to the first and second clamping members of the servo writer engaging the head positioner assembly in this manner. Instead, the first and second clamping members of the servo writer may engage the head positioner assembly in any manner so long as the first and second clamping members of the servo writer engage opposing portions of the head positioner assembly at a location that allows the servo writer to control the position of the head positioner assembly.

Servo writing operations in the case of the third aspect may be undertaken with the various components of the disk drive being within an at least substantially enclosed space. In this case, the first and second clamping members of the servo writer may be directed as a single unit through a push pin hole in the disk drive base plate so as to dispose an appropriate portion of the head positioner assembly between the first and second clamping members. Once the first and second clamping members of the servo writer have engaged opposing portions of the head positioner assembly, the first and second clamping members of the servo writer push pin may be collectively moved as a single unit one or more times relative to the data storage medium (i.e., no relative movement between the first and second clamping members at this time) to position the disk drive head(s) at a desired location (e.g., a certain distance from a rotational axis of the data storage medium) for writing servo information on the data storage medium. The first and second clamping members of the servo writer maintain the head positioner assembly in a fixed position at each such location as servo information is written onto the data storage medium. Upon completion of servo writing operations, the first and second clamping members of the servo writer may be released from the head positioner assembly, and thereafter the first and second clamping members of the servo writer may be withdrawn as a single unit back through the push pin hole. That is, the first and second clamping members of the servo writer push pin may appropriately disengage the head positioner assembly upon completion of servo writing operations (and prior to the first and second clamping members of the servo writer being withdrawn as a single unit back through the push pin hole).

The engagement of the first and second clamping members of the servo writer with the head positioner assembly is subject to a number of characterizations in the case of the third aspect. Opposing forces may be exerted on the head positioner assembly by the first and second clamping members. These opposing forces may be coplanar with or parallel to the plane in which the head positioner assembly moves, may be orthogonal to the plane in which the head positioner assembly moves, or in any other appropriate orientation. Any appropriate portion of the head positioner assembly may be engaged by the first and second clamping members, so long as the engaged portion moves along with the head positioner assembly. Therefore, any attachment to the head positioner assembly that is mounted on the head positioner assembly in a fixed position could be engaged by the first and second clamping members. This attachment would then be considered as being part of the head positioner assembly. In one embodiment, the first and second clamping members of the servo writer engage opposing portions of a first actuator arm of the head positioner assembly. Another embodiment has the first and second clamping members of the servo writer engaging opposite sides of such a first actuator arm. "Sides" again means the structural boundaries of the first actuator arm that are spaced in the dimension in which the head positioner assembly at least generally moves. The first and second clamping members may engage opposing portions of the first actuator arm, or any other appropriate opposing portions of the head positioner assembly, in any appropriate manner (e.g., the first and second clamping members could engage upper and lower surfaces, respectively, of the first actuator arm).

Only a relative movement between the above-noted first and second clamping members is required to engage opposing portions of the head positioner assembly in the case of the third aspect. One embodiment has the second clamping member being maintained in a stationary position while the first clamping member is moved such that the first and second clamping members engage opposing portions of the head positioner assembly. Another embodiment has at least one of the first and second clamping members being movable relative to the other of the first and second clamping members such that the first and second clamping members engage opposing portions of the head positioner assembly. As such, one or both of the first and second clamping members may be moved relative to the other of the first and second clamping members such that the first and second clamping members engage opposing portions of the head positioner assembly.

The movement of the first and second clamping members of the servo writer, once having engaged opposing portions of the head positioner assembly, is also subject to a number of characterizations in the case of the third aspect. One characterization is that the first and second clamping members of the servo writer collectively move as a single unit at least generally along an arcuate path. Another characterization is that the first and second clamping members of the servo writer collectively move as a single unit at least generally about a first axis. In one embodiment, the first and second clamping members are appropriately mounted on a servo writer positioning arm, such that this servo writer positioning arm may then be pivoted to in turn move the head positioner assembly (as the first and second clamping members are engaging opposing portions of the head positioner assembly at this time). Although the first and second clamping members of the servo writer may engage opposing portions of the head positioner assembly at any appropriate location for controlling its position during servo writer operations, in one embodiment the first and second clamping members of the servo writer engage opposing portions of the head positioner assembly at a location that is spaced from an axis about which the head positioner assembly moves.

Multiple forces may be exerted on the head positioner assembly by the first and second clamping members of the servo writer in the case of the third aspect. One such force is the force by which the first and second clamping members of the servo writer push pin engage opposing portions of the head positioner assembly. Another force is the force that is exerted on the head positioner assembly by a collective movement of the first and second clamping members of the servo writer as a single unit and while the first and second clamping members remain engaged with opposing portions of the head positioner assembly.

One advantage of the third aspect is that the engagement of the first and second clamping members of the servo writer with opposing portions of the head positioner assembly alleviates the need for exerting a back-bias on the head positioner assembly during servo writing operations. For instance, a disk drive voice coil motor associated with the head positioner assembly need not be operated in a manner so as to exert a force on the head positioner assembly that opposes the force being exerted on the head positioner assembly by a movement of the first and second clamping members as a single unit to change the position of the head positioner assembly. This may be beneficial in a number of respects.

DETAILED DESCRIPTION OF THE INVENTION

Figure 1:
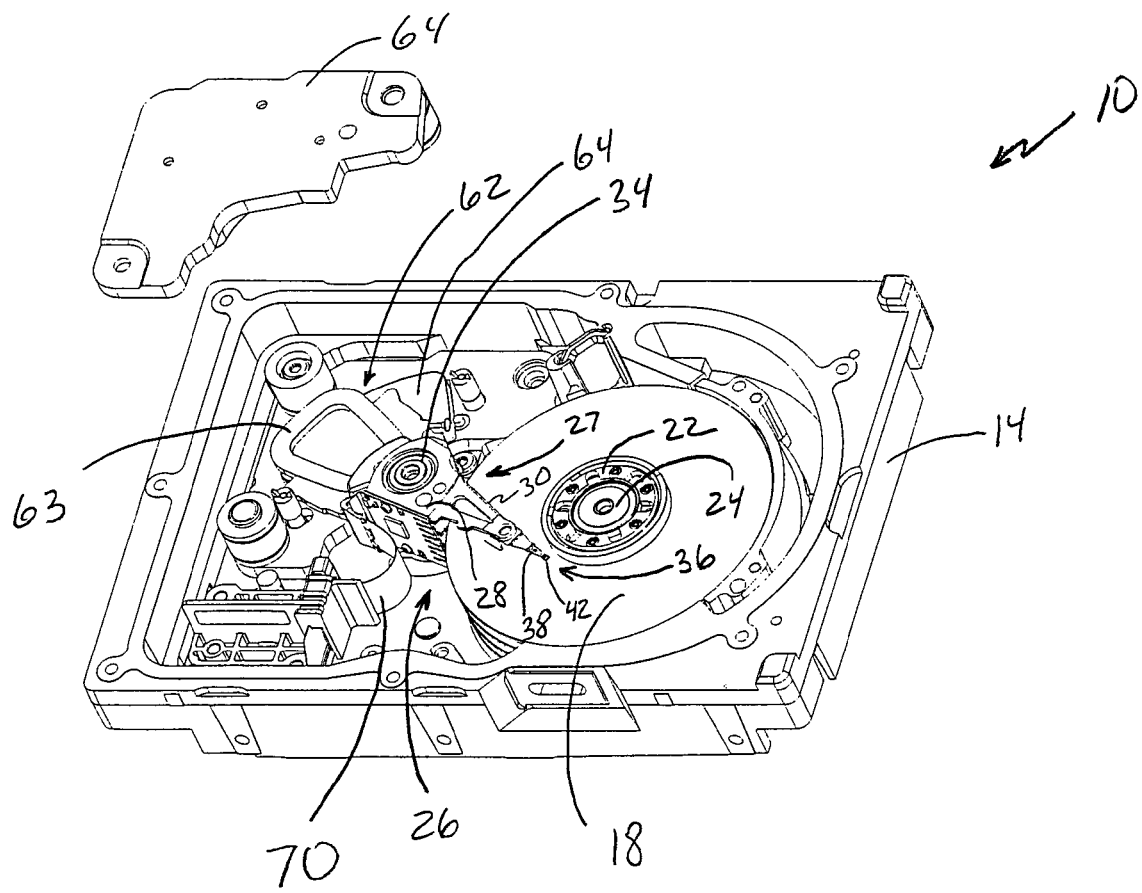
FIG. 1 is a perspective view of a prior art disk drive that may be manufactured using a servo writer having a clamping push pin.
Figure 2:
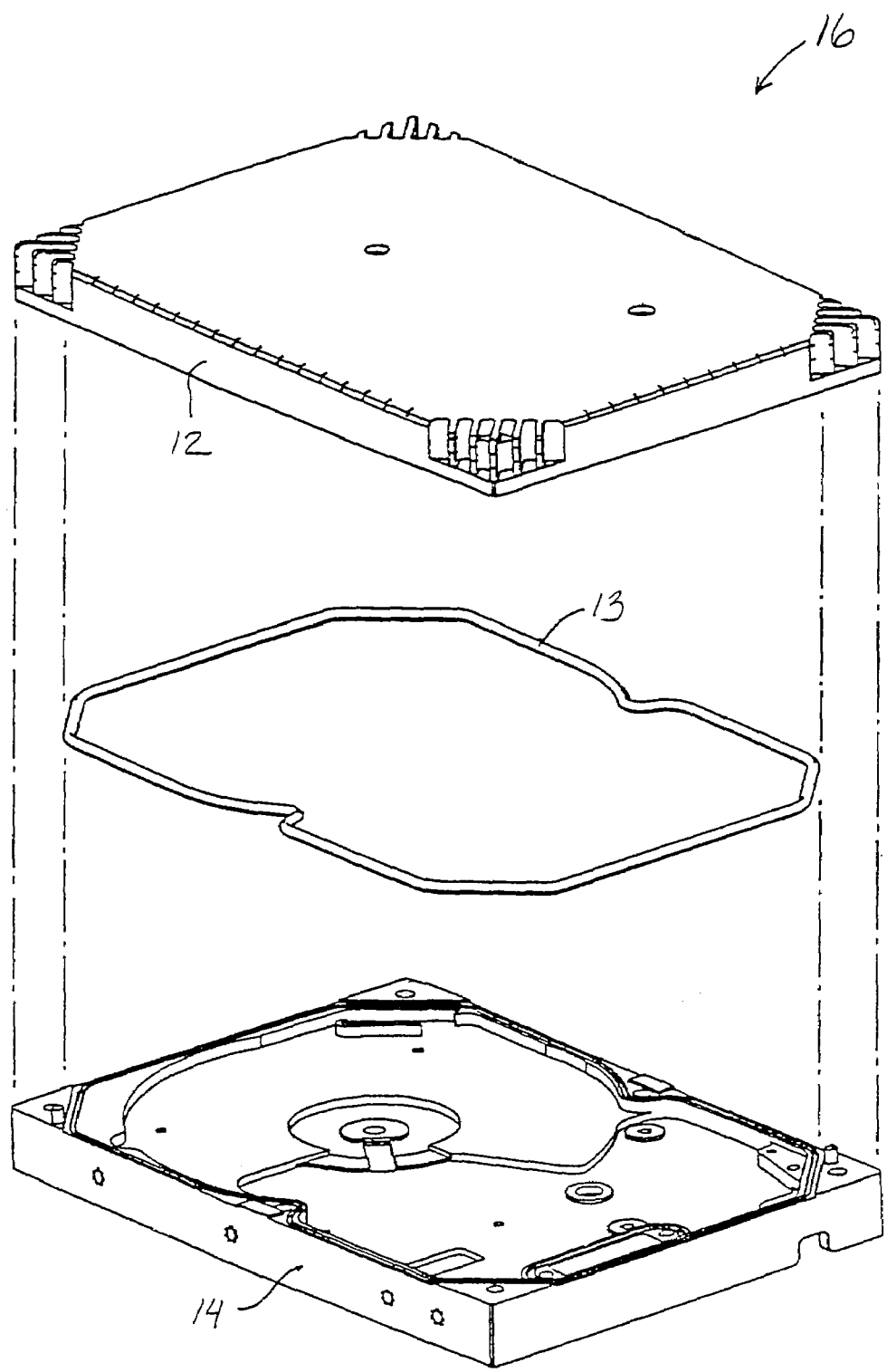
FIG. 2 is an exploded, perspective view of a prior art disk drive housing for the disk drive of FIG. 1.

One configuration of a prior art disk drive 10 is illustrated in FIGS. 1–4. However, this disk drive 10 may be manufactured using a servo writer having a clamping push-pin of the type of the type described herein, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
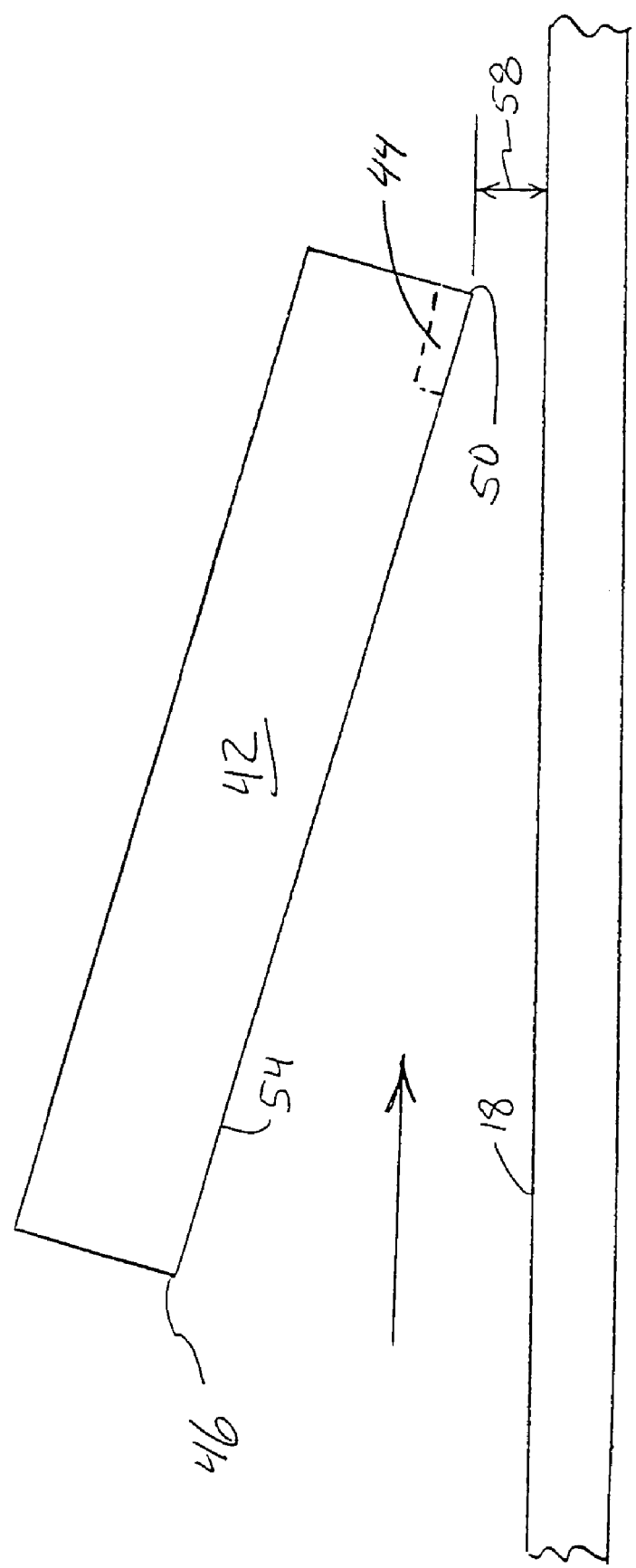
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
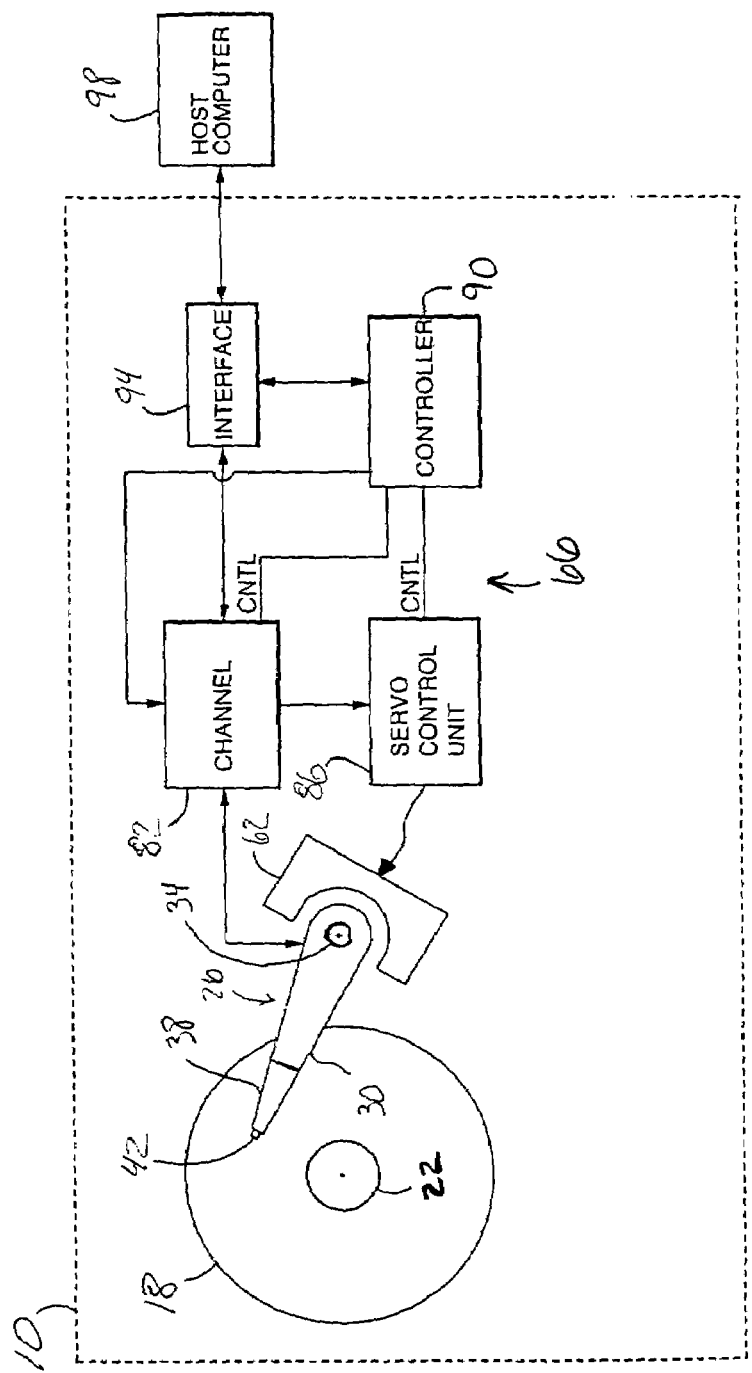
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
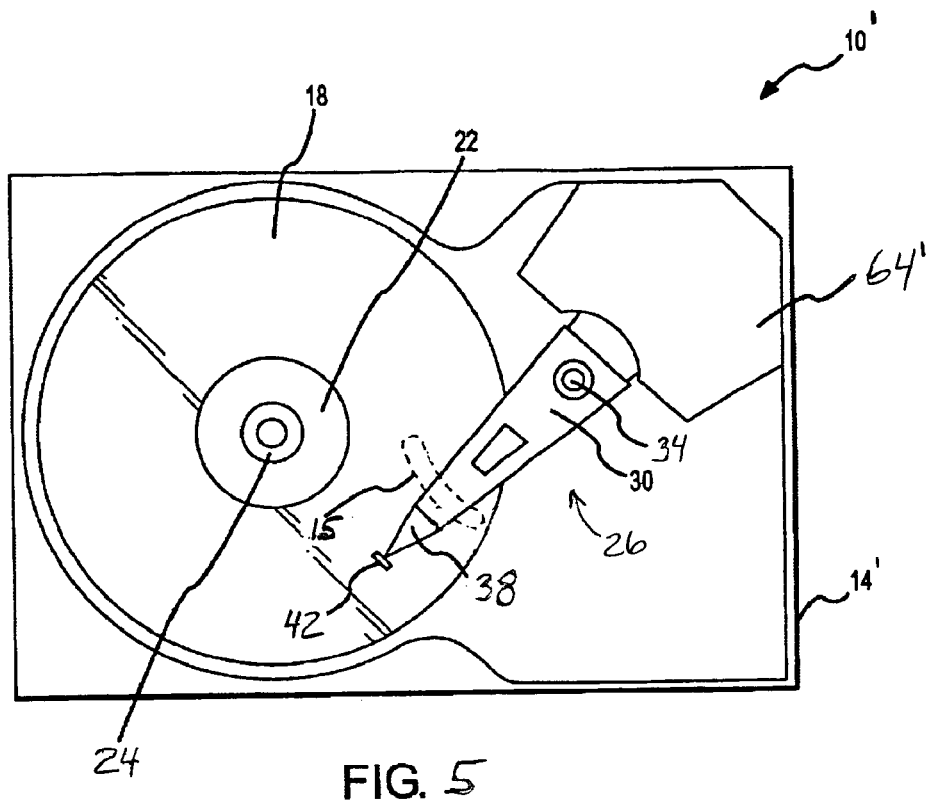
FIG. 5 is a top view of another prior art disk drive that may be manufactured using a servo writer having a clamping push pin, illustrating a push-pin hole in the base plate of the disk drive.

A variation of the disk drive 10 of FIGS. 1–4 is illustrated in FIG. 5 and is identified by reference numeral "10," along with a "single prime" designation so as to indicate the existence of at least one variation. Common components are identified by the same reference number, along with a "single prime" designation where appropriate. Principally, the disk drive 10' has the head positioner assembly 26 in a different position from that of the embodiment of FIGS. 1–4, which may change the configuration of the base plate 14' and the upper VCM magnet assembly 64'. The disk drive 10' also illustrates a push pin hole 15 that extends through the base plate 14'. This push pin hole 15 is used for servo writing operations during the manufacture of the disk drive 10', and is thereafter sealed for execution of normal disk drive operations, such as by placing tape over the push pin hole 15.

Figure 6:
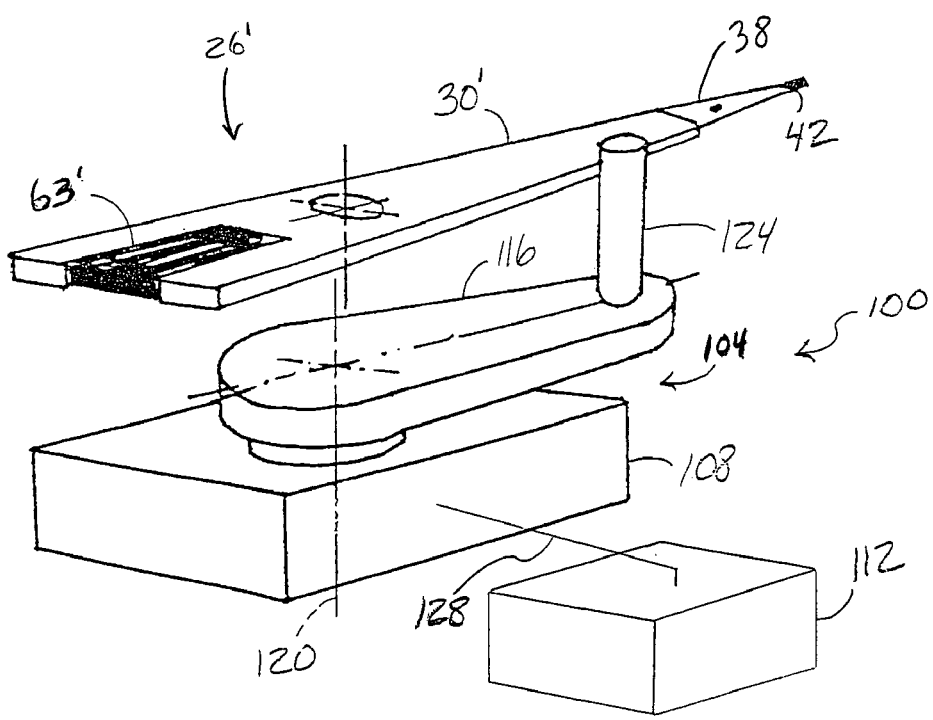
FIG. 6 is a schematic, perspective view of a prior art servo writer.

Servo writing operations are part of the manufacture of the disk drive, and include writing or recording servo information at various locations of one or more data storage disks of the disk drive. Typically there will be servo information associated with each data storage track on each data storage surface of each data storage disk. This servo information is used during subsequent disk drive operations where information is read from and/or written to one or more data storage disks. More specifically, the servo information is used to accurately position each head of the disk drive relative to the relevant data storage track. Certain relevant fundamentals of servo writing operations in general are illustrated in FIG. 6. Here, another embodiment of a head positioner assembly 26' for a disk drive is illustrated in the form of a single actuator arm 30' having a coil 63' for a VCM mounted thereon. Also illustrated are relevant portions of a servo writer 100 for positioning the disk drive head positioner assembly 26' for servo writing operations. This same servo writer 100 may be used with any appropriate configuration of a disk drive head positioner assembly.

The servo writer 100 of FIG. 6 includes a positioning system 104 having a platform 108 to which various components of the positioning system 104 may be either directly or indirectly mounted, as well as a control unit 112 that interfaces with the platform 108 by an interconnect 128 of any appropriate type (e.g., operative, structural, or both). The control unit 112 functions to control servo writing functions of the servo writer 100, including the positioning of its push or positioning arm 116. In this regard, a first end of the positioning arm 116 is interconnected with the platform 108 in a manner that allows the positioning arm 116 to pivot or rotate about an axis 120. A push pin 124 is appropriately interconnected with the positioning arm 116 at its second end (e.g., at any location that is displaced from the axis 120) for engaging the disk drive head positioner assembly 26' for servo writing operations.

Servo writing operations are typically undertaken after the various components of the disk drive (e.g., the head positioner assembly, each data storage disk) have been enclosed within a space collectively defined by the drive's base plate and the cover. Access to such an enclosed space may be provided by a push pin hole that is typically in the base plate of the disk drive, although it is possible that such a push pin hole could be provided for the cover. It should be appreciated that servo writing operations are by no means dependent upon the drive being "sealed", and thereby could be performed with the cover being off of the base plate.

The disk drive is moved relative to the servo writer in any appropriate manner such that the push pin 124 of the servo writer 100 will protrude through the push pin hole in the disk drive housing and into the noted enclosed space to interface with an appropriate surface of the head positioner assembly 26'. Typically, this will be an actuator arm 30', although the push pin 124 could also interface with any appropriate structure that moves along with the head positioner assembly 26'. Once the push pin 124 is engaged with the head positioner assembly 26', movement of the positioning arm 116 of the servo writer 100 about the axis 120 will move the head positioner assembly 26' about its associated pivot or rotational axis 120 (e.g., via a pivot bearing 34). This will then dispose each head of the head positioner assembly 26' at the desired radial position of its corresponding data storage disk to write servo information thereon. The VCM of the disk drive may be used to provide a resistance force (e.g., a back-bias or DC back-bias) in a direction that is opposite that of the force being exerted on the head positioner assembly 26' by the servo writer positioning arm 116 of the servo writer 100 via the push pin 124. Such a resistance force functions to attempt to maintain constant contact between the push pin 124 and the head positioner assembly 26', to thereby attempt to enable the servo writer positioning system 104 to position the head positioner assembly 26' in a controlled and accurate manner.

Servo information will be recorded on one or more data storage disks of the disk drive at various radial locations from their corresponding rotational axis. The head positioner assembly 26' will be maintained in a stationary position for the recordation of servo information on one or more data storage disks at a given radial location or radius from the rotational axis of the disk(s). The positioning arm 116 of the servo writer 100 will then be moved, to in turn move the head positioner assembly 26' to a different radial location relative to each data storage disk of the disk drive. Servo information will then be recorded on one or more data storage disks at this new radial location. This general procedure will be repeated until the desired/required servo information has been recorded on or written to one or more data storage disks of the disk drive. Thereafter, the disk drive may be moved relative to the servo writer 100 in any appropriate manner to withdraw the push pin 124 from the interior of the disk drive via its push pin hole. Again, the push pin hole is then typically sealed in an appropriate manner (e.g., via tape).

There are a number of potential issues with regard to the configuration of the servo writer 100. One is that there is an "attachment resonance" of sorts due to the manner in which the servo writer 100 and the head positioner assembly 26' are mechanically "coupled." Although a back-bias may be used to oppose the force being exerted on the head positioner assembly 26' by the servo writer 100 through its push pin 124, the push pin 124 is still not adequately coupled to the head positioner assembly 26'. This may cause undesired vibrations. This "attachment resonance" may be within the range from about 900 Hz to about 2,000 Hz. Vibrations of this type may get written into the servo pattern on the data storage disk(s), potentially leading to track following performance degradations or TAZ spiral distortion. While utilizing a visco-elastic damping material on the surface of the push pin 124 that interfaces with the head positioner assembly 26' may at least in part address this "attachment resonance," there still may be issues with regard to the servo information that is being recorded on the data storage disk(s) due to the use of a back-bias and/or the compliance of such a visco-elastic dampening material.

A clamping push pin for a servo writer is illustrated in FIGS. 7A–D, is identified by reference numeral 148, and addresses the above-noted attachment resonance with the disk drive head positioner assembly. Also illustrated in FIGS. 7A–D is yet another variation of the head positioner assembly 26 of FIGS. 1–4, and that is identified by reference numeral "26" along with a "double prime" designation so as to indicate the existence of this variation. Common components are identified by the same reference number, along with a "double prime" designation where appropriate. The actuator body 28" in FIGS. 7A–D is of a slightly different configuration, including in relation to how the coil (not shown in FIGS. 7A–D) of the VCM would interface with the actuator body 28". The head positioner assembly 26" uses three actuator arms 30, but could use any number of actuator arms 30. Notwithstanding the illustration of the clamping push pin 148 in relation to the head positioner assembly 26", it will be appreciated that the push pin 148 may be used/adapted for servo writing operations on disk drives having head positioner assemblies of various configurations.

The push pin 148 may be characterized as being part of a push pin assembly 140. The push pin assembly 140 would be mounted on the push or positioning arm 116 of the servo writer 100 of FIG. 6 in place of the push pin 124. It should be appreciated that the "prior art" status of the servo writer 100 of FIG. 6 does not encompass the modification of the same to include the push pin assembly 140 versus the push pin 124. In order to emphasize that this is the case, the configuration where the push pin 124 is replaced with the push pin assembly 140 and its clamping push pin 148 will be referred to as servo writer 100'. The servo writer 100' is not known to be in the prior art.

The push pin assembly 140 includes a housing 144 of any appropriate configuration. There are two main components of the push pin 148—a first jaw or clamping member 152 and a second jaw or clamping member 172. The first clamping member 152 is movably interconnected with the housing 144 so as to allow for changing the spacing between the first clamping member 152 and the second clamping member 172. Reducing the spacing between the first clamping member 152 and the second clamping member 172 allows the push pin 148 to exert a clamping or compressive force on the head positioner assembly 26". In the illustrated embodiment, the push pin 148 exerts a clamping or compressive force on opposing sides of the "lowest" actuator arm 30 of the head positioner assembly 26" (the actuator arm 30 that is closest to the base plate). However, the push pin 148 could clamp onto any relevant portion of the head positioner assembly 26" (which would include any structure that is separately attached to the head positioner assembly 26") so long as the push pin 148 clamps onto something that moves along with the head positioner assembly 26" relative to the data storage disk(s) of the disk drive.

The first clamping member 152 may be movably interconnected with the housing 144 in any appropriate manner. Stated another way, the first clamping member 152 may move relative to the second clamping member 172 in any appropriate manner that allows part of the head positioner assembly 26" to be clamped between the first clamping member 152 and the second clamping member 172. In the illustrated embodiment, the first clamping member 152 is pivotally interconnected with the housing 144 such that the first clamping 152 moves along an arcuate path. In this regard, the first clamping member 152 is movably interconnected with the housing 144 by a pivot 160. Other possible types of movement that may be employed for the first clamping member 152 include an axial or one-dimensional motion (e.g., via a slide-connection between the first clamping member 152 and the housing 144) and a rotating cam structure or sliding cam structure.

Changing the position of the first clamping member 152 relative to the second clamping member 172 is accomplished by an adjustment screw 164 or the like in the illustrated embodiment. This adjustment screw 164 is threadably engaged with the first clamping member 152 and is rotatably anchored against either the housing 144 or the second clamping member 172. Rotation of the adjustment screw 164 in one direction causes the first clamping member 152 to pivot away from the second clamping member 172 to increase the spacing therebetween. This may be used to initially position the clamping push pin 148 for engagement with the head positioner assembly 26", but without actually contacting the head positioner assembly 26". This may also be used to "release" the clamping push pin 148 from the head positioner assembly 26" at the end of servo writing operations. Rotation of the adjustment 164 in the opposite direction causes the first clamping member 152 to pivot toward the second clamping member 172 to decrease the spacing therebetween. This may be used to "clamp" the push pin 148 onto the head positioner assembly 26" for servo writing operations.

The illustrated embodiment uses one type of "mechanical drive or actuator" for moving the first clamping member 152. Any other appropriate type of mechanical drive or actuator could be utilized as well. Any appropriate actuation or actuation technology may be used for that matter. Representative examples include a pneumatic-based actuator/actuation technique (e.g., vacuum, cylinder, or diaphragm), a shape memory alloy or SMA-based actuator/actuation technique (e.g., a material having at least one dimension that changes in response to a change in temperature accomplished, for instance, by passing an electrical signal through a wire or the like), an electrical-based actuator/actuation technique (e.g., a DC motor), or a magnetic-based actuator/actuation technique (e.g., by mounting a magnet on the head positioner assembly 26"). Any combination of actuators/actuation techniques also may be used to move the first clamping member 152 for clamping the push pin 148 onto the head positioner assembly 26" and for unclamping the push pin 148 from the head positioner assembly 26".

The first clamping member 152 includes an engagement surface 156 that interfaces with the disk drive head positioner assembly 26". The engagement surface 156 is convex in the illustrated embodiment, and more specifically is cylindrical. Stated another way, the engagement surface 156 is arcuate about an axis that is parallel with the axis about which the head positioner assembly 26" moves. Advantages of this configuration for the engagement surface 156 include accommodating a pivoting action for moving the first clamping member 152 to clamp the push pin 148 onto the disk drive head positioner assembly 26", and avoiding having to align the planar engagement surface on the drive positioner assembly 26" so as to be coplanar with a corresponding planar engagement surface of the first clamping member 156. The fixed second clamping member 172, though shown in the illustrated embodiment as having a planar engagement surface 176, could also be incorporated as actuate about an axis that is parallel with the axis about which the head positioner assembly 26" moves, and further could be acruately shaped as well, all in accordance with the above discussion of the first clamping member 156. Notwithstanding these types of advantages, other configurations may be appropriate for the engagement surface 156 of the first clamping member 152, including without limitation being flat.

The first clamping member 152 may be formed from any appropriate material, including without limitation a rigid material (e.g., a metal). The engagement surface 156 of the first clamping member 152 could also be in the form of an elastic or visco-elastic material (e.g., to provide a damping function). Although it may be possible for the entire first clamping member 152 to be formed of an elastic or visco-elastic material, more typically any such elastic or visco-elastic material would be in the form of a layer that is separately attached to the remainder of the first clamping member 152. Although there may be advantages for having a non-compliant coupling between the push pin 148 and the head positioner assembly 26" (e.g., to increase the "rigidity" of the coupling between the push pin 148 and the head positioner assembly 26"), it may be desirable to include an elastic or visco-elastic material on the engagement surface 156 (e.g., to allow limited slip or "give" between the push pin 148 and the head positioner assembly 26" due to a misalignment between the servo writer 100' and the disk drive that includes the head positioner assembly 26"). Another possible option for addressing a misalignment between the server writer 100' and the disk drive that includes the head positioner assembly 26" would be to allow the first clamping member 152 to somehow "flex" relative to the housing 144 of the push pin assembly 140, such as by incorporating a limited flex hinge (not shown) between the first clamping member 152 and the housing 144.

The second clamping member 172 may be interconnected with the housing 144 in any appropriate manner, and could in fact be a part thereof (e.g., formed integrally with the housing 144 such that there is no joint therebetween, instead of the second clamping member 172 being separately attached to the housing 144 as shown). In the illustrated embodiment, the second clamping member 172 is maintained in a fixed position relative to the housing 144 of the push pin assembly 140. Stated another way, the second clamping member 172 is not intended to move relative to the housing 144 in the case of the illustrated embodiment. However, it should be appreciated that the second clamping member 172 could be movably interconnected with the housing 144 in the same manner as the first clamping member 152, and yet still allow the push pin 148 to clamp onto the head positioner assembly 26" in the manner described herein.

The second clamping member 172 includes an engagement surface 176 that directly interfaces with the head positioner assembly 26". The engagement surface 176 is a flat or planar surface in the illustrated embodiment, and that is preferably disposed parallel with the surface of the head positioner assembly 26" with which it interfaces. Representative advantages of this configuration of the engagement surface 176 and disposing the same in parallel relation to the engaged portion of the head positioner assembly 26' include creation of a boundary surface that may provide improved control of the "attachment resonance" created by the mechanical interface of the head positioner assembly 26" and the push pin assembly 140. Notwithstanding these types of advantages, other configurations may be appropriate for the engagement surface 176 of the second clamping member 172, including without limitation being in the form of the engagement surface 156 of the first clamping member 152.

The second clamping member 172 may be formed from any appropriate material, including without limitation a rigid material (e.g., a metal). The engagement surface 176 of the second clamping member 172 could also be in the form of an elastic or visco-elastic material (e.g., to provide a damping function). Although it may be possible for the entire second clamping member 172 to be formed of an elastic or visco-elastic material, more typically any such elastic or visco-elastic material would be in the form of a layer that is separately attached to the remainder of the second clamping member 172. Although again there may be advantages for having a non-compliant coupling between the push pin 148 and the head positioner assembly 26", it may be desirable to include an elastic or visco-elastic material on the engagement surface 176 (e.g., to allow limited slip or "give" between the push pin 148 and the head positioner assembly 26" due to a misalignment between the servo writer 100' and the disk drive). Another possible option for addressing a misalignment between the server writer 100' and the disk drive that includes the head positioner assembly 26" would be to allow the second clamping member 172 to somehow "flex" relative to the housing 144 of the push pin assembly 140, such as by incorporating a limited flex hinge (not shown) between the second clamping member 172 and the housing 144.

One end of a biasing member 168 engages the first clamping member 152, while its opposite end may engage one or both of the housing 144 and the second clamping member 172. Generally, the biasing member 168 exerts a force on at least the first clamping member 152 that tends to increase the spacing between the first clamping member 152 and the second clamping member 172. This may be desirable in that it allows an opening to be formed between the first clamping member 152 and second clamping member 172 when the adjustment screw 164 or other actuation force mechanism is loosened or de-activated. The opening is larger than the actuator arm 30 such that the actuator arm 30 can easily be placed in the opening between the first clamping member 152 and the second clamping member 172 for loading of the disk drive 10 into the servo writer 100. Any appropriate material and/or configuration may be used for the biasing member 168.

Figure 7A:
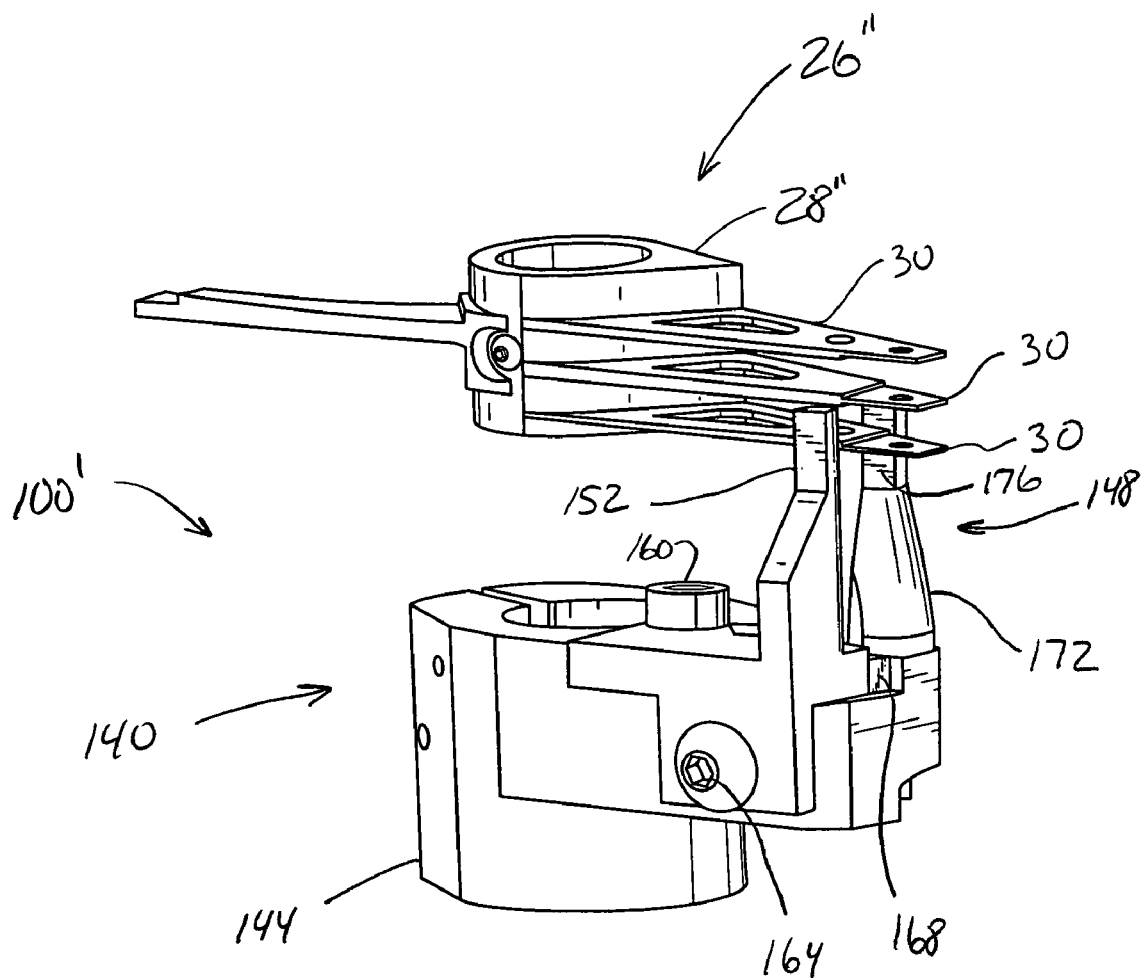
FIG. 7A is a perspective view of one embodiment of a clamping push pin engaged with a head positioner assembly of a disk drive for servo writing operations.
Figure 7B:
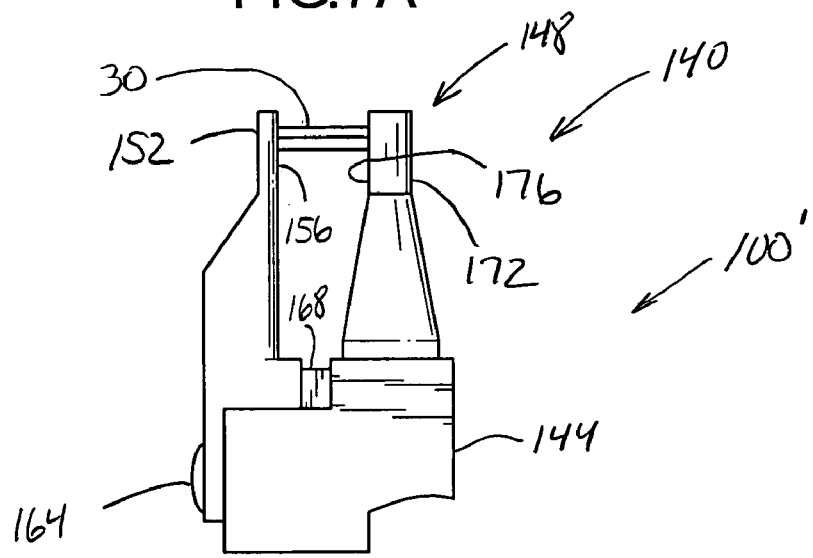
FIG. 7B is an end of view of the clamping push pin of FIG. 7A and its engagement with the head positioner assembly.
Figure 7C:
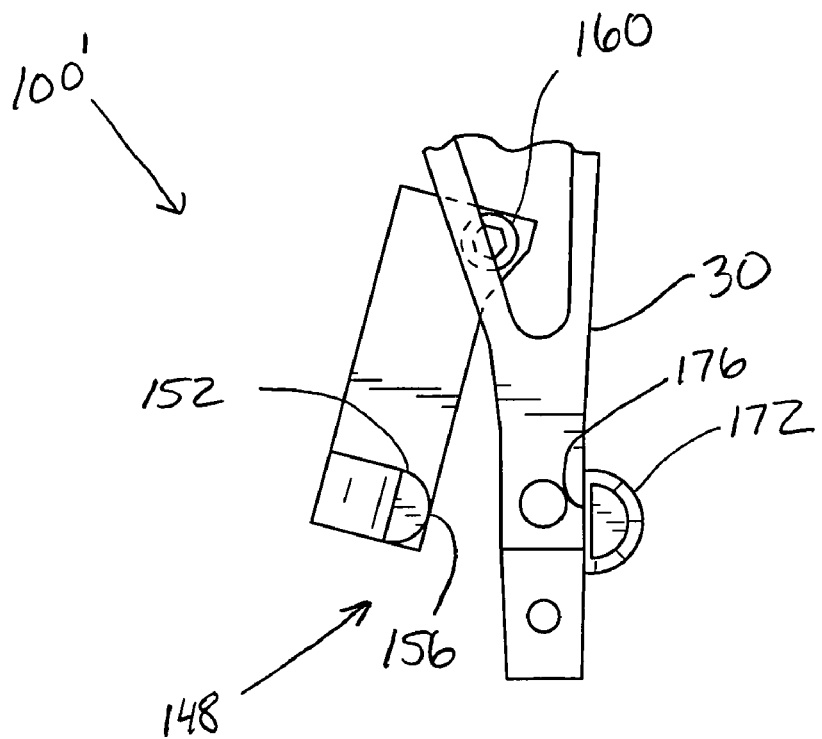
FIG. 7C is a top view of the clamping push pin of FIG. 7A, prior to engaging the head positioner assembly for servo writing operations.
Figure 7D:
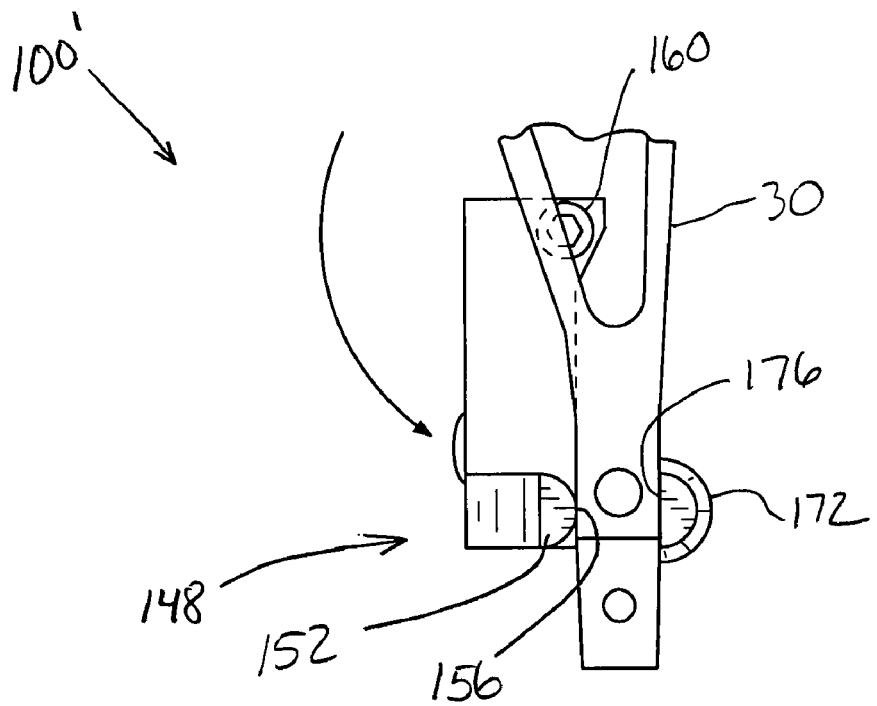
FIG. 7D is a top view of the clamping push pin of FIG. 7A, while engaging the head positioner assembly for servo writing operations.

Based upon the foregoing, the push pin 148 clamps onto the head positioner assembly 26" by a movement of the first clamping member 152 relative to the second clamping member 172. All that is required is a relative movement that reduces the spacing between the first clamping member 152 and the second clamping member 172. This causes the push pin 148 to exert a compressive force on the head positioner assembly 26", or to exert opposing forces on the head positioner assembly 26". Referring to FIGS. 7C–D, the push pin 148 would be positioned relative to the head positioner assembly 26" with the first clamping member 152 and the second clamping member 172 being separated by a space to allow an actuator arm 30 to be disposed therebetween. Once again, this would normally entail directing the push pin 148 through a push pin hole in the base plate of the disk drive that is utilizing the head positioner assembly 26". Preferably, the first clamping member 152 and the second clamping member 172 are separated by a space that is greater than the width of the portion of the head positioner assembly 26" that is to be engaged by the push pin 148 such that the push pin 148 may be moved into the relevant position without contacting the head positioner assembly 26". The engagement of the head positioner assembly 26" with the pivoting first clamping member 152 may be what brings the second clamping member 172 into engagement with the head positioner assembly 26". Alternatively, the entire servo writer 100' may be moved to establish contact between the second clamping member 172 and the head positioner assembly 26" before the first clamping member 152 is pivoted into engagement with the head positioner assembly 26". In any case, once a relevant portion of the head positioner assembly 26" is located between the first clamping member 152 and the second clamping member 172, the spacing between the first clamping member 152 and the second clamping member 172 is reduced such that the aligned portion of head positioner assembly 26" is clamped between the first clamping member 152 and the second clamping member 172. In the illustrated embodiment, this is provided by moving only the first clamping member 152. However, this reduction of the spacing between the first clamping member 152 and the second clamping member 172 could be provided by moving only the second clamping member 172, or moving both the first clamping member 152 and the second clamping member 172.

The actual magnitude of the clamping force that is exerted on the head positioner assembly 26" by the push pin 148 is preferably such that there is no relative movement between the push pin 148 and the head positioner assembly 26" during servo writing operations, particularly during movement of the push or positioning arm 116 of the servo writer 100' for purposes of moving the head positioner assembly 26". In one embodiment, the push pin 148 exerts a clamping force of at least about 8 pounds on the head positioner assembly 26".

With the push pin 148 being clamped onto the head positioner assembly 26", the positioning arm 116 of the servo writer 100' may be moved about its axis 120 to in turn change the position of the head positioner assembly 26" by a movement about its associated pivot or rotational axis. Specifically, the movement of the positioning arm 116 of the servo writer 100' will cause a force to be transmitted to the head positioner assembly 26" through the push pin 148 that changes the position of the head positioner assembly 26". Servo writing operations may then be executed in the same general manner discussed above in relation to the servo writer 100. Once the desired servo information has be recorded on or written to the data storage disk(s), the spacing between the first clamping member 152 and the second clamping member 172 may be increased such that at least the first clamping member 152 becomes disengaged with the head positioner assembly 26". Thereafter, the push pin 148 may be withdrawn through the push pin hole in the base plate by a movement of the servo writer 100' relative to the disk drive. Preferably, there would be a relative movement of the servo writer 100' relative to the disk drive such that the second clamping member 176 would also become disengaged with the head positioner assembly 26".

Due to the manner in which the push pin 148 clamps onto the head positioner assembly 26", there is no need to exert a back-bias on the head positioner assembly 26" through operation of the disk drive's VCM. In fact, the VCM of the disk drive need not be operated at all during servo writing operations based upon the clamping engagement of the head positioner assembly 26" provided by the push pin 148. Specifically, a back-bias need not be exerted on the head positioner assembly 26" by the VCM while the positioning arm 116 of the servo writer 100' is being maintained in a stationary position. Moreover, a back-bias need not be exerted on the head positioner assembly 26" by the VCM while the positioning arm 116 of the servo writer 100' is being moved to a different position, to in turn move the head positioner assembly 26" to a different radial location (a different radius from its rotational axis) on the disk(s) of the disk drive. There is also no need to use a "tandem seek" for servo writing operations when using the push pin 148 (i.e., no need to provide a proportional drive signal to the VCM and positioning arm 116 of the servo writer 100' to move the head positioner assembly 26" to a different location relative to the data storage disk(s) of the disk drive; instead, a drive signal need only be sent to the positioning arm 116 of the servo writer 100' when using the push pin 148). However, using a back-bias and/or a tandem seek could still be employed for the case of the servo writer 100' and its use of the clamping push pin 148, if this would be desirable for any reason.

Figure 8A:
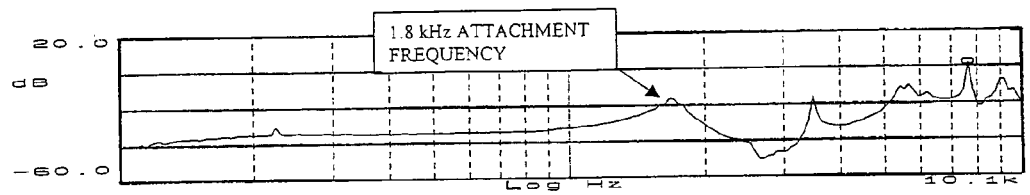
FIG. 8A is a Bode (frequency response) plot of the engagement of a conventional "undamped" push pin and a head positioner assembly.
Figure 8B:
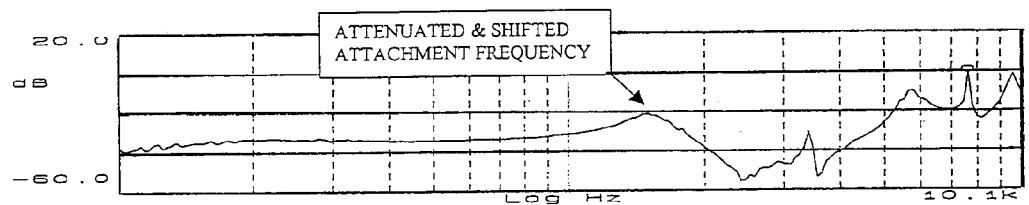
FIG. 8B is a Bode (frequency response) plot of the engagement of one configuration of a conventional "damped" push pin and a head positioner assembly.
Figure 8C:
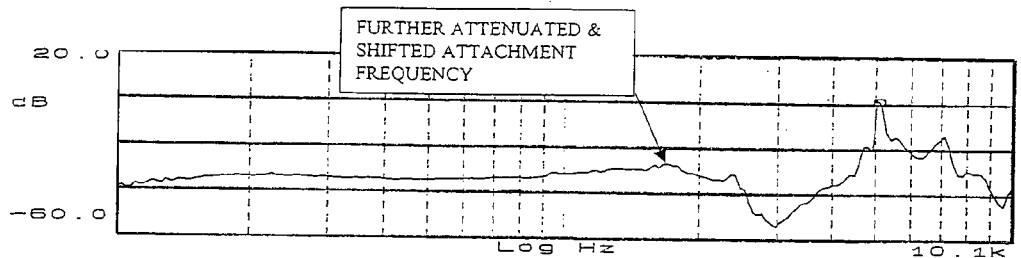
FIG. 8C is a Bode (frequency response) plot of the engagement of a clamping push pin and a head positioner assembly.

FIGS. 8A–C illustrate an advantage of the clamping push pin 148 in relation to reducing the "attachment resonance" between the head positioner assembly and the servo writer. FIG. 8A is a Bode (frequency response) plot of the engagement of a conventional solid steel push pin (e.g., push pin 124) and a head positioner assembly. Note the 1.8 kHz attachment frequency. FIG. 8B is a Bode (frequency response) plot of the engagement of one configuration of a "damped" push pin (specifically a glued, internally damped push pin) and a head positioner assembly. Note the attenuation and shifting of the attachment frequency from that presented in FIG. 8A. Finally, FIG. 8C is a Bode (frequency response) plot of the engagement of the push pin 148 and a head positioner assembly. Note the further attenuation and shifting of the attachment frequency from that presented in FIG. 8B. As noted above, the creation of a boundary surface may provide improved control of the "attachment resonance" created by the mechanical interface of the head positioner assembly 26" and the push pin assembly 140.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for making a disk drive, wherein said disk drive comprises a first data storage medium and a head positioner assembly that is movable relative to said first data storage medium, wherein a servo writer comprises a push pin, and wherein said method comprises the steps of:
   clamping said push pin onto a first portion of said head positioner assembly, wherein said clamping step comprises exerting opposing forces on said first portion of said head positioner assembly with said push pin;
   transmitting a first force to said head positioner assembly through said push pin, wherein said first force moves said head positioner assembly from a first position to a second position relative to said first data storage medium; and
   writing servo information on said first data storage medium.

2. A method, as claimed in claim 1, wherein:
said clamping step comprises said push pin engaging a first actuator arm of said head positioner assembly.

3. A method, as claimed in claim 1, wherein:
said clamping step comprises said push pin engaging opposing sides of a first actuator arm of said head positioner assembly.

4. A method, as claimed in claim 1, wherein:
said clamping step alleviates a need to exert a back-bias on said head positioner assembly for servo writing operations.

5. A method, as claimed in claim 1, wherein:
said push pin comprises first and second clamping members that are separated by a first space, wherein said first portion of said head positioner assembly is disposed within said first space, and wherein said clamping step comprises reducing a width of said first space.

6. A method, as claimed in claim 5, further comprising the step of:
releasing said push pin from said first portion of said head positioner assembly after said writing step, wherein said releasing step comprises increasing a width of said first space such that at least one of said first and second clamping members is disengaged from said first portion of said head positioner assembly.

7. A method, as claimed in claim 1, wherein:
said push pin comprises first and second clamping members, wherein said clamping step comprises moving only one of said first and second clamping members.

8. A method, as claimed in claim 1, wherein:
said push pin comprises first and second clamping members, wherein said clamping step comprises moving at least one of said first and second clamping members.

9. A method, as claimed in claim 1, wherein:
said first force used by transmitting step is different from a force used by said clamping step.

10. A method, as claimed in claim 1, wherein:
said transmitting step is executed after said clamping step has been initiated and during a continued execution of said clamping step.

11. A method, as claimed in claim 1, wherein:
said transmitting step comprises moving said push pin about a first axis.

12. A method, as claimed in claim 1, wherein:
said transmitting step comprises moving said push pin relative to said first data storage medium during said clamping step.

13. A method, as claimed in claim 1, wherein:
said transmitting step is executed at a first location that is spaced from a first axis about which said head positioner assembly moves.

14. A method, as claimed in claim 1, wherein:
said servo writer comprises a positioning arm on which said push pin is mounted, wherein said transmitting step comprises pivoting said positioning arm about a first axis during said clamping step.

15. A method, as claimed in claim 1, further comprising the step of:
operating a voice coil motor of said disk drive so as to not exert a back-bias on said head positioner assembly during said transmitting step.

16. A method, as claimed in claim 1, further comprising the step of:
releasing said push pin from said first portion of said head positioner assembly after said writing step.

17. A method, as claimed in claim 1, further comprising the steps of:
directing said push pin through a push pin hole in a base plate of said disk drive before initiating said clamping, transmitting, and writing steps; and
withdrawing said push pin back through said push pin hole after termination of said clamping, transmitting, and writing steps.

18. A method for making a disk drive, wherein said disk drive comprises a first data storage medium and a head positioner assembly that is movable relative to said first data storage medium, wherein a servo writer comprises a push pin, and wherein said method comprises the steps of:
clamping said push pin onto a first portion of said head positioner assembly, wherein said clamping step comprises disposing said first portion of said head positioner assembly in an open space between spaced portions of said push pin, and wherein a clamping force is exerted on said first portion of said head positioner assembly by said spaced portions of said push pin;
moving said push pin relative to said first data storage medium, wherein said moving said push pin step is executed after said clamping step has been initiated and during a continued execution of said clamping step;
moving said head positioner assembly from a first position to a second position relative to said first data storage medium, wherein said moving said head positioner step is responsive to said moving said push pin step; and writing servo information on said first data storage medium.

19. A method, as claimed in claim 18, wherein:
said clamping step comprises exerting opposing forces on said first portion of said head positioner assembly with said push pin.

20. A method, as claimed in claim 18, wherein:
said clamping step comprises said push pin engaging a first actuator arm of said head positioner assembly.

21. A method, as claimed in claim 18, wherein:
said clamping step comprises said push pin engaging opposing sides of a first actuator arm of said head positioner assembly.

22. A method, as claimed in claim 18, wherein:
said clamping step alleviates a need to exert a back-bias on said head positioner assembly for servo writing operations.

23. A method, as claimed in claim 18, wherein:
said push pin comprises first and second clamping members that are separated by a first space, wherein said first portion of said head positioner assembly is disposed within said first space, wherein said clamping step comprises reducing a width of said first space, and wherein said first and second clamping members comprise said spaced portions of said push pin.

24. A method, as claimed in claim 23, further comprising the step of:
releasing said push pin from said first portion of said head positioner assembly after said writing step, wherein said releasing step comprises increasing a width of said first space such that at least one of said first and second clamping members is disengaged from said first portion of said head positioner assembly.

25. A method, as claimed in claim 18, wherein:
said push pin comprises first and second clamping members, wherein said clamping step comprises moving only one of said first and second clamping members, and wherein said first and second clamping members comprise said spaced portions of said push pin.

26. A method, as claimed in claim 18, wherein:
said push pin comprises first and second clamping members, wherein said clamping step comprises moving at least one of said first and second clamping members, and wherein said first and second clamping members comprise said spaced portions of said push pin.

27. A method, as claimed in claim 18, wherein:
said clamping step is executed at a first location that is spaced from a first axis about which said head positioner assembly moves.

28. A method, as claimed in claim 18, wherein:
said moving said push pin step is at least generally along an arcuate path.

29. A method, as claimed in claim 18, wherein:
said moving said push pin step comprises moving said push pin about a first axis.

30. A method, as claimed in claim 18, wherein:
said moving said push pin step comprises said push pin exerting a first force on said head positioner assembly.

31. A method, as claimed in claim 30, wherein:
said first force is different from a force used by said clamping step.

32. A method, as claimed in claim 18, wherein:
said servo writer comprises a positioning arm on which said push pin is mounted, wherein said moving said push pin step comprises pivoting said positioning arm about a first axis.

33. A method, as claimed in claim 18, further comprising the step of:
operating a voice coil motor of said disk drive so as to not exert a back-bias on said head positioner assembly during said moving said head positioner assembly step.

34. A method, as claimed in claim 18, further comprising the step of:
releasing said push pin from said first portion of said head positioner assembly after said writing step.

35. A method, as claimed in claim 18, further comprising the steps of:
directing said push pin through a push pin hole in a base plate of said disk drive before execution of said clamping, moving said push pin, moving said head positioner assembly, and writing steps; and
withdrawing said push pin back through said push pin hole after termination of said clamping, moving said push pin, moving said head positioner assembly, and writing steps.

36. A method for making a disk drive, wherein said disk drive comprises a first data storage medium and a head positioner assembly that is movable relative to said first data storage medium, wherein a servo writer comprises first and second clamping members, and wherein said method comprises the steps of:
disposing a portion of said head positioner assembly into a spacing between said first and second clamping members;
reducing said spacing between said first and second clamping members after said disposing step;
engaging opposing portions of said head positioner assembly with said first and second clamping members, wherein said engaging step is responsive to said reducing step;
moving said first and second clamping members together relative to said first data storage medium, wherein said moving said first and second clamping members step is executed after said engaging step has been initiated and during a continued execution of said engaging step;
moving said head positioner assembly from a first position to a second position relative to said first data storage medium, wherein said moving said head positioner assembly step is responsive to said moving said first and second clamping members step; and
writing servo information on said first data storage medium.

37. A method, as claimed in claim 36, wherein:
said engaging step comprises engaging opposing sides of a first actuator arm of said head positioner assembly.

38. A method, as claimed in claim 36, wherein:
said engaging step alleviates a need to exert a back-bias on said head positioner assembly for servo writing operations.

39. A method, as claimed in claim 36, wherein:
said engaging step is executed at a first location that is spaced from a first axis about which said head positioner assembly moves.

40. A method, as claimed in claim 36, wherein:
said reducing step comprises moving only one of said first and second clamping members.

41. A method, as claimed in claim 36, wherein:
said reducing step comprises moving at least one of said first and second clamping members.

42. A method, as claimed in claim 36, wherein:
said reducing step exerts a force on said head positioner assembly, and wherein said moving said first and second clamping members step exerts a different force on said head positioner assembly.

43. A method, as claimed in claim 36, wherein:
said servo writer comprises a positioning arm on which said first and second clamping members are mounted, wherein said moving said first and second clamping members step comprises pivoting said positioning arm about a first axis.

44. A method, as claimed in claim 36, further comprising the step of:
operating a voice coil motor of said disk drive so as to not exert a back-bias on said head positioner assembly during said moving said first and second clamping members step.

45. A method, as claimed in claim 36, further comprising the step of:
increasing said spacing between said first and second clamping members after said writing step, wherein said increasing step disengages at least one of said first and second clamping members from said head positioner assembly.

46. A method, as claimed in claim 36, wherein:
said disposing step comprises directing said first and second clamping members of said servo writer through a push pin hole in a base plate of said disk drive, and wherein said method further comprises the step of withdrawing said first and second clamping members of said servo writer back through said push pin hole after termination of said engaging, moving said first and second clamping members, moving said head positioner assembly, and writing steps.

\* \* \* \* \*